US010727719B2

(12) United States Patent
McGoogan et al.

(10) Patent No.: US 10,727,719 B2
(45) Date of Patent: Jul. 28, 2020

(54) POWER GENERATOR ASSEMBLY FOR ROTATING APPLICATIONS

(71) Applicant: Aktiebolaget SKF, Gothenburg (SE)

(72) Inventors: Gerard McGoogan, Taynuilt (GB); Georgo Angelis, Oss (NL); Toon Kuijpers, Den Bosch (NL); Aditya Mehendale, Geldrop (NL); Gerard Johannes Pieter Nijsse, Bodegraven (NL); Funda Sahin Nomaler, Eindhoven (NL); Andreas Clemens van der Ham, Utrecht (NL)

(73) Assignee: AKTIEBOLAGET SKF, Gothenburg (DE)

( * ) Notice: Subject to any disclaimer, the term of this patent is extended or adjusted under 35 U.S.C. 154(b) by 178 days.

(21) Appl. No.: 15/546,760

(22) PCT Filed: Feb. 5, 2016

(86) PCT No.: PCT/EP2016/052512
§ 371 (c)(1),
(2) Date: Jul. 27, 2017

(87) PCT Pub. No.: WO2016/128320
PCT Pub. Date: Aug. 18, 2016

(65) Prior Publication Data
US 2018/0019641 A1 Jan. 18, 2018

(30) Foreign Application Priority Data
Feb. 9, 2015 (GB) .................................. 1502096.9

(51) Int. Cl.
*H02K 7/18* (2006.01)
*B61D 43/00* (2006.01)
(Continued)

(52) U.S. Cl.
CPC .......... *H02K 7/1846* (2013.01); *B61D 43/00* (2013.01); *B61F 5/14* (2013.01); *B61K 9/00* (2013.01);
(Continued)

(58) Field of Classification Search
CPC .......... H02K 7/1846; H02K 7/04; H02K 7/18; H02K 1/14; H02K 1/223; H02K 11/042;
(Continued)

(56) References Cited

U.S. PATENT DOCUMENTS

2014/0285053 A1\* 9/2014 Himmelmann ...... H02K 21/042
 310/181
2016/0039434 A1\* 2/2016 Van Der Ham ........ B61F 15/20
 301/108.1

FOREIGN PATENT DOCUMENTS

CN 102498646 A 6/2012
DE 102010021159 A1 11/2011
(Continued)

OTHER PUBLICATIONS

Office Action from the Chinese Patent Office dated Aug. 27, 2019 in related Chinese application No. 201680008733.7, and translation thereof.

*Primary Examiner* — Michael Andrews
(74) *Attorney, Agent, or Firm* — J-TEK Law PLLC; Scott T. Wakeman; Mark A. Ussai

(57) ABSTRACT

A power generator assembly including a rotating part and a non-rotating part is provided. It is proposed that the rotating part includes first and second, circumferentially adjacent generator units. Each generator unit includes at least one coil, at least one permanent magnet and two pole shoes having pole surfaces facing radially outward. The non-rotating part includes an arc-shaped saddle adaptor of ferromagnetic material arranged with a radial distance to the pole surfaces. The saddle adaptor is configured to close a (Continued)

magnetic circuit passing via the pole shoes through the coil in a rotational position where the saddle adaptor overlaps with the pole shoes of a generator unit. According to the invention, a pole shoe of the first generator unit and an adjacent pole shoe of the second generator unit have the same magnetic polarity.

16 Claims, 4 Drawing Sheets

(51) Int. Cl.
  *B61F 5/14*  (2006.01)
  *B61K 9/00*  (2006.01)
  *H02K 21/44*  (2006.01)
  *G01M 17/10*  (2006.01)
  *H02K 1/14*  (2006.01)
  *H02K 1/22*  (2006.01)
  *H02K 7/04*  (2006.01)
  *H02K 11/042*  (2016.01)
  *H02K 21/10*  (2006.01)
  *B61F 5/52*  (2006.01)

(52) U.S. Cl.
  CPC .............. *G01M 17/10* (2013.01); *H02K 1/14* (2013.01); *H02K 1/223* (2013.01); *H02K 7/04* (2013.01); *H02K 11/042* (2013.01); *H02K 21/10* (2013.01); *H02K 21/44* (2013.01); *B61F 5/52* (2013.01)

(58) Field of Classification Search
  CPC ........ H02K 21/10; H02K 21/44; H02K 21/38; G01M 17/10; B61K 9/00; Y02T 30/36; B61D 43/00; B61F 5/14; B61F 5/50; B61F 15/00; B61F 15/20
  USPC ................ 310/68 B, 181, 216.024, 216.023, 310/216.027
  See application file for complete search history.

(56) References Cited

FOREIGN PATENT DOCUMENTS

| | | | | |
|---|---|---|---|---|
| DE | 102010037912 | A1 | 4/2012 | |
| EP | 2149963 | A2 * | 2/2010 | ............. H02K 1/223 |
| GB | 2132788 | A | 7/1984 | |
| GB | 2321788 | A * | 8/1998 | ............. B61D 43/00 |
| GB | 2321788 | A | 8/1998 | |
| JP | S63161858 | A | 7/1988 | |
| WO | 8907362 | A1 | 8/1989 | |

* cited by examiner

POWER GENERATOR ASSEMBLY FOR ROTATING APPLICATIONS

CROSS REFERENCE

This is a United States National Stage Application claiming the benefit of International Application Number PCT/EP2016/052512 filed on Feb. 5, 2016, which claims the benefit of British Patent Application 1502096.9 filed on Feb. 9, 2015, both of which are incorporated herein by reference in their entireties.

FIELD OF THE INVENTION

Power generator assemblies including a rotating part and a non-rotating part are widely known. A stator as a non-rotating part is then usually configured such that it encompasses the rotor as a rotating part completely.

BACKGROUND OF THE INVENTION

One type of generator assembly is a so-called variable reluctance generator wherein a magnetic circuit powered by a permanent magnet and passing through a coil is periodically opened and closed. The AC voltage induced in the coil as a result of the oscillating magnetic field may be used to generate energy or to drive other devices.

In some applications, the room for a stator encompassing the rotor may be limited and be available only on one side. For example in train bogies with saddle type suspension, it may be possible to arrange additional structures on or in a saddle adapter, whereas structures arranged below the axle may be excluded for security reasons and extreme environmental conditions.

BRIEF SUMMARY OF THE INVENTION

The invention seeks to provide a versatile generator assembly suitable for use in situations where an amount or a quality of available space in different radial directions of a rotating part is inhomogeneous.

The invention relates to a power generator assembly including a rotating part and a non-rotating part, in particular to a power generator assembly for use in a train axlebox, wherein the rotating part is configured to be mounted on an end cap.

It is proposed that the rotating part includes at least first and second, circumferentially arranged generator units. Each generator unit is preferably of modular type and includes at least one coil, at least one permanent magnet and two pole shoes having pole surfaces facing radially outward. The non-rotating part includes an arc-shaped saddle adaptor of ferromagnetic material arranged with a radial gap to the pole surfaces. The saddle adaptor is configured to close a magnetic circuit passing via the pole shoes through the coil in at least one first rotational position where the saddle adaptor overlaps with the pole shoes of a generator unit, wherein the magnetic circuit is at least partially opened if the saddle adaptor does not overlap or does not overlap completely with both of the pole shoes.

The configuration described above works based on a variable reluctance generator principle in that the oscillating magnetic field of the magnetic circuit being periodically opened and closed induces an oscillating voltage in the coil of each generator unit. This oscillating voltage can be used for driving electronic devices arranged on the rotating part as desired without external power supply.

In the context of the invention, the expression arc-shaped means that the saddle adaptor does not extend over the entire circumference but only over a certain fraction thereof, wherein that fraction differs from both 0° and 360° by at least the angular length of a generator unit, i.e. the distance between the middle points or the outer edges of the pole surfaces.

In particular, the circumferential lengths of a generator unit and of the saddle adaptor are such that at least one second rotational position exists where the saddle adaptor does not overlap with the pole shoes of a generator unit. In this configuration, the magnetic circuit should be at least partly open and the magnetic flux will be significantly lower. The magnetic flux therefore changes from minimum to maximum when the rotating part rotates from the second rotational position to the first rotational position and vice versa.

As mentioned, the power generator assembly has at least first and second generator units. Additional units can be added to increase the output power if required. Preferably, the generator units are substantially identical to each other and are arranged adjacent to each other in circumferential direction.

There is consequently a risk of magnetic flux leakage between the generator units, which might adversely affect the magnitude of the difference between the maximum and minimum magnetic flux through a generator coil as the rotating part rotates from the second rotational position to the first rotational position and vice versa.

According to the invention, this problem is alleviated in that the direction of magnetization of adjacent generator units is oppositely oriented. In other words, adjacent pole shoes of adjacent generator units have the same magnetic polarity.

In a further development, leakage of magnetic flux is further reduced in that an additional permanent magnet is arranged between the adjacent pole shoes of at least the first and second generator units. Suitably, the direction of magnetization of the additional permanent magnet is such that the magnetic flux is oriented in the same direction as that of the adjacent pole shoes. The additional permanent magnet will be referred to as a guide magnet and has the effect of repelling stray magnetic flux, so as to guide the flux to the saddle adapter.

In a still further development, the power generating assembly comprises at least one shunt magnet which has the effect of increasing the net flux difference between maximum and minimum when a generator unit rotates between the first and second rotational positions. The at least one shunt magnet is arranged in proximity to at least one of the generator units and is configured to produce a magnetic field that is oppositely oriented from the magnetic field produced by the at least one generator unit. When the at least one generator unit is not underneath the saddle adaptor, i.e. in the "open" first rotational position, the shunt magnet reduces the net magnetic flux of the at least one generator unit. The magnetic flux may even become negative. When the generator unit is underneath the saddle adaptor, i.e. in the "closed", second rotational position, the shunt magnet also reduces the net magnetic flux. However, the reduction in flux is relatively less when the unit is in the closed position, meaning that a greater difference between the maximum and minimum flux is achieved. This improves the power output of the generator unit.

In a preferred embodiment of the invention, the rotating part is configured to be mounted on an end cap configured to hold a bearing of a train axle and the saddle adaptor is configured to be mounted on a train bogie side frame.

If necessary, the rotating part comprises at least one counterweight unit configured to compensate for imbalances created by the arrangement of at least two adjacent generator units.

The counterweight unit may itself comprise a generator unit having at least one coil, at least one permanent magnet and two pole shoes having pole surfaces facing radially outward. For example, the rotating part of the power generating assembly may comprise a first generator device, having two or more circumferentially adjacent generator units, and comprise a second generator device, having two or more circumferentially adjacent generator units, whereby the second generator device is arranged at an angular interval from the first generator device, which interval is selected to rotationally balance the rotating part.

As will be understood, the mass of and location of further components of the rotating part are taken into account when determining the angular position of the counterweight unit.

According to a further development, it is proposed that the saddle adaptor includes a main body part and at least one additional piece configured to increase the surface area of the saddle adaptor and/or decrease the air gap provided between the saddle adaptor and the pole shoes. In the case of a train axlebox, the main body may be integrated in the saddle or saddle adapter of a saddle type train bogie suspension.

In one example, the at least one additional piece comprises a toothed radially inner surface, such that a varying radial gap is provided between the saddle adaptor and the pole shoes. This has the advantage of increasing flux change. In a further example, the radially inner surface of the saddle adapter is directly provided with such a toothed profile.

The invention further proposes that the rotating part includes power harvesting electronics configured to accumulate AC power generated by the oscillating magnetic field passing through the coils.

Further, it is proposed that the rotating part includes at least one condition monitoring sensor and a wireless transmitter configured to be driven by power generated by the at least one generator unit. The condition monitoring sensor may be a temperature sensor, a vibration sensor or other type of sensor for monitoring an operating parameter of interest.

The invention further proposes that the rotating part comprises means for monitoring an output signal from at least one generator unit. Suitably, the generated voltage signal is monitored. The signal is necessarily cyclical in nature and may thus be used to determine rotational speed of the rotating part and, in the case of a train axle, the linear distance travelled.

Signal amplitude may also be monitored. The amplitude varies depending on the radial gap between the pole shoes and the radially inner surface of the saddle adaptor and on a degree of axial overlap between the pole shoes and said surface.

In the case of a train axle comprising a first and a second power generator assembly according to the invention at first and second ends of the axle respectively, the monitored voltage signal from the first and second assemblies may advantageously be compared with each other. If, for example, both signals exhibit a similar change in voltage, this may be used to detect a sideways movement of a train bogie that comprises the axle.

A yet further aspect of the invention relates to a train bogie including a power generator assembly according to the invention.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE INVENTION

Figure 1:
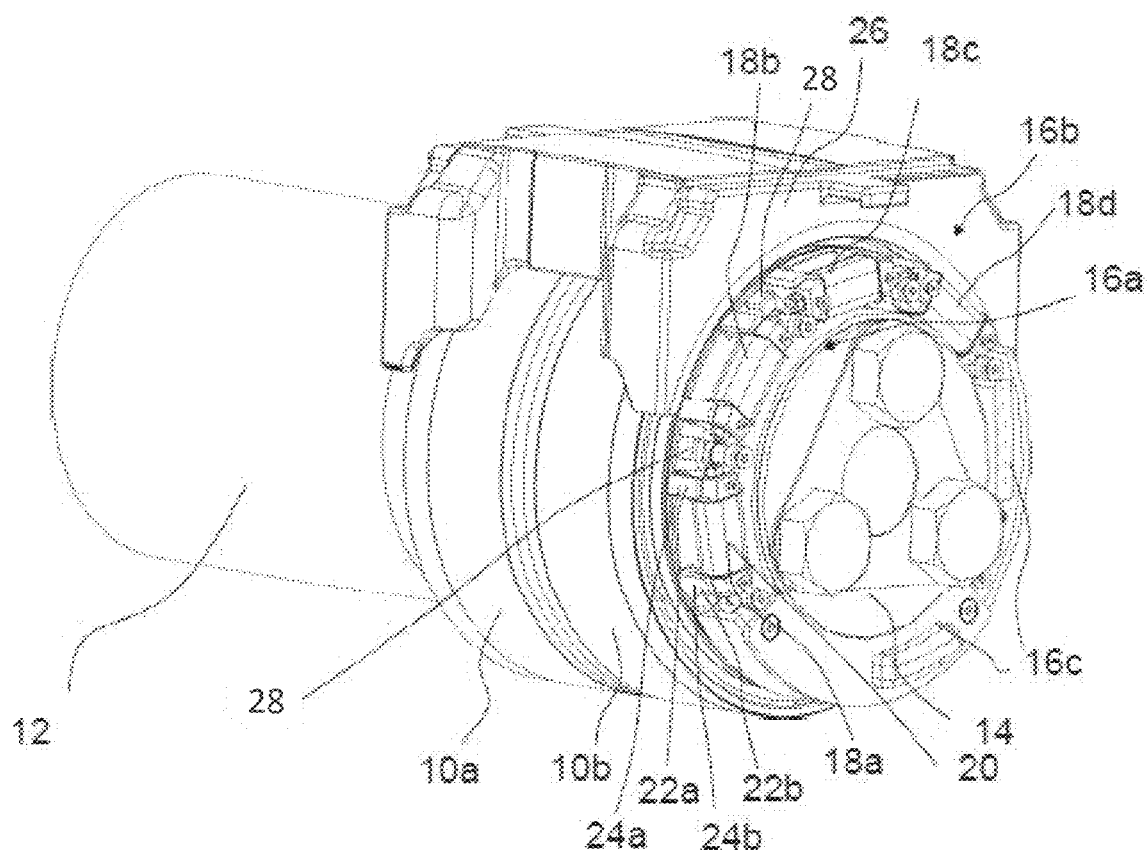
FIG. 1 is a schematic view of an end part of a train axle equipped with a power generator assembly according to the invention.

FIG. 1 is a schematic view of an end part of a train axle, wherein outer rings 10a, 10b of a double row tapered roller bearing configured to mount the axle 12 in the saddle type adapter 26 of a train bogie are visible.

An end cap 14 is fastened to an end face of the axle 12 by means of three bolts and preloads a split inner ring of the bearing in an axial direction. A rotating part 16a of a power generator assembly according to the invention is provided on an outer rim of the end cap 14. The outer rim of the end cap 14 is substantially divided in two halves. One section 16c houses the electronics and the other half includes multiple generator units 18a-18d. Four generator units 18a-18d are provided in the embodiment illustrated.

The power generator assembly includes the rotating part 16a and a non-rotating part 16b. The generator units 18a-18d are of modular type and essentially identical in configuration. Each of the generator units 18a-18d includes one coil 20 arranged between two permanent magnets 22a, 22b and first and second pole shoes having pole surfaces 24a, 24b facing radially outward each. In the embodiment illustrated, the first and second pole shoes are formed by first and second permanent magnets 22a, 22b which are arranged such that a first pole surface 24a has a first polarity and a second pole surface 24b has an opposite polarity. The pole shoes may also be formed by opposite poles of a single magnet.

The non-rotating part 16b includes an arc-shaped saddle adaptor 26 of ferromagnetic material, in particular iron, arranged with a radial gap to the pole surfaces 24a, 24b.

The saddle adaptor is configured to close a magnetic circuit passing via the pole shoes 22a, 22b through the coil in a rotational position where the saddle adaptor 26 overlaps with the pole shoes 22a, 22b of one of the generator units 18a-18d, wherein the magnetic circuit is at least partially opened if the saddle adaptor 26 does not overlap or does not overlap completely with both of the pole shoes 22a, 22b.

When the axle is rotating, the saddle adaptor 26 periodically passes the generator unit 18a such that the magnetic flux will be periodically varying. The oscillating magnetic field of the magnetic circuit being periodically opened and closed induces an oscillating voltage in the coil of the generator unit. This oscillating voltage can be then used for driving electronic devices arranged in the electronics section 16c of the assembly as desired without external power supply.

The circumferential lengths of the first generator unit 18a and of the saddle adaptor 26 are such that at least one rotational position exists where the saddle adaptor 26 does not overlap with the pole shoes 22a, 22b of the first generator unit. Specifically, the circumferential length of the saddle adaptor 26 is a multiple of the circumferential length and the pitch of the generator units 18a-18d such that these are closed in a first rotational position and open in a second rotational position.

Figure 2A:
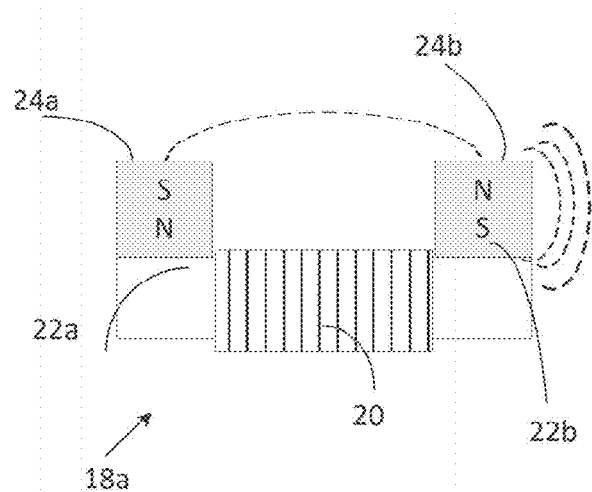
FIGS. 2a and 2b are schematic illustrations of the principle of operation of the power generator assembly.
Figure 2B:
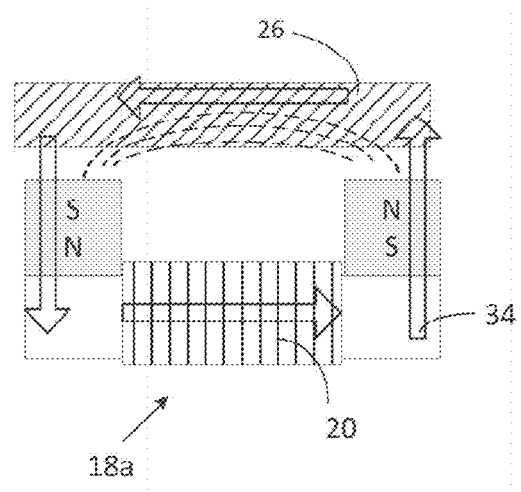

The principle of operation is illustrated in FIGS. 2a and 2b, wherein the saddle adaptor 26 and a first generator unit 18a are illustrated without curvature for the sake of simplicity. FIG. 2a illustrates the case where the saddle adaptor 26 does not overlap with the pole shoes 22a, 22b of the generator unit. Mainly, magnetic flux passes from the North pole to the South pole of each permanent magnet 22a, 22b, as shown by the dashed magnetic field lines at the second pole shoe 22b. There may also be a weak magnetic flux passing between the two magnets 22a, 22b and through the coil, as illustrated by the dashed line extending between the pole surfaces 24a, 24b of the generator unit 18a.

In the presence of a ferromagnetic material, i.e. when the saddle adaptor 26 overlaps with the pole shoes 22a, 22b of the generator unit 18a, the majority of magnetic flux is guided through the saddle adapter 26, as illustrated by the dashed lines in FIG. 2b, and a magnetic circuit is formed that causes a strong magnetic flux to pass through the coil. The arrows 34 in FIG. 2b show the direction of the principle magnetic circuit that is generated. The associated magnetic field will be referred to as the generator field.

Figure 3A:
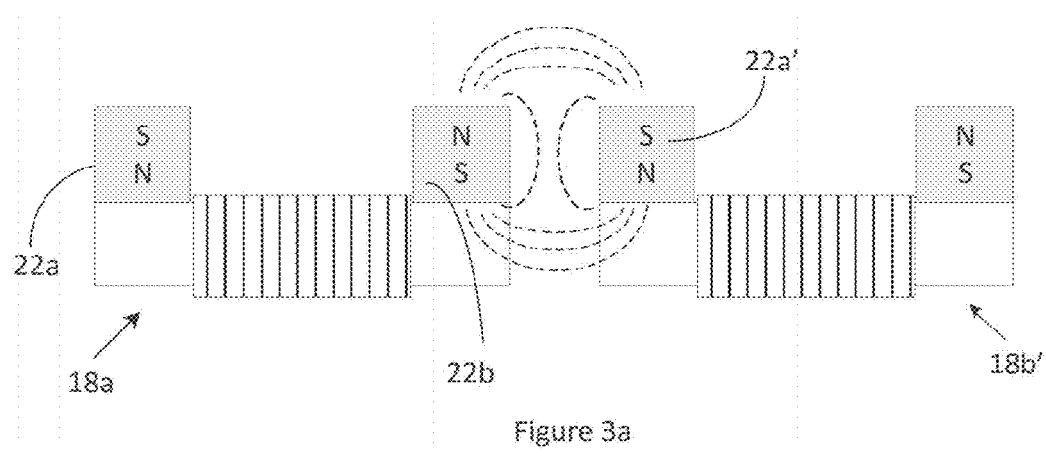
FIG. 3a is a schematic illustration of a power generator assembly comprising two adjacent generator units with magnetic fields oriented in the same direction.

When two or more generators are arranged next to each other, there is a risk of flux leakage between adjacent units. Consider the situation depicted in FIG. 3a, in which a first generator unit 18a and a second generator unit 18b' are schematically shown. Again, the pole shoes of the generator units are formed by permanent magnets. The second pole shoe 22b of the first generator unit 18a and the adjacent first pole shoe 22a' of the second generator unit have opposite magnetic polarity. The dashed magnetic field lines indicate the magnetic flux that is generated between the two units 18a and 18b'. This flux represents leakage and will be generated when the units are in an "open" first rotational position and in a "closed" second rotational position. Consequently, the flux through the coil 20 of each generator unit will be less and the change in flux will be less, leading to lower power generation.

Figure 3B:
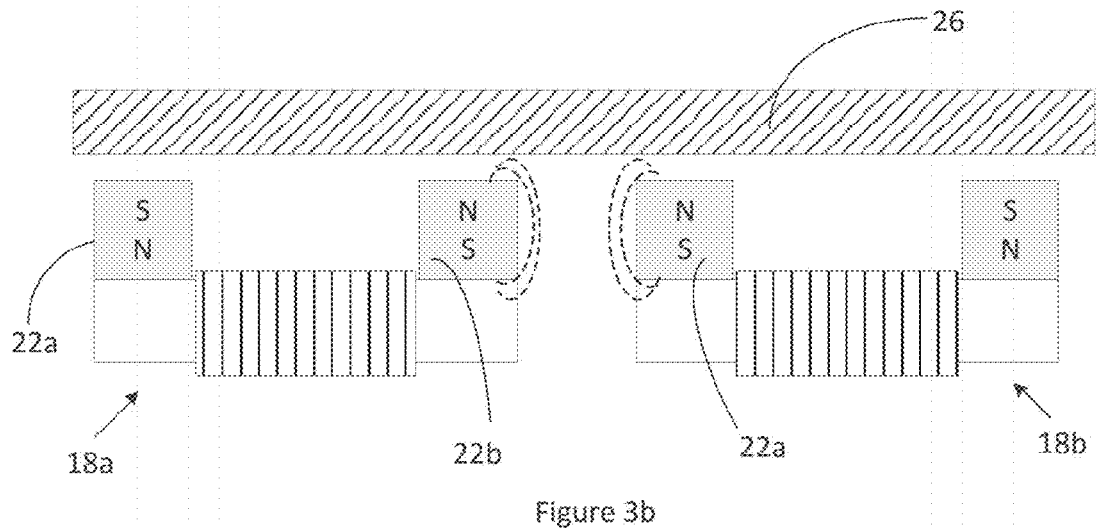
FIG. 3b is a schematic illustration of an assembly according to the invention comprising adjacent generator units with oppositely oriented magnetic fields.

In an assembly according to the invention, flux leakage between adjacent units is reduced, as illustrated in FIG. 3b. Here, the second pole shoe 22b of the first generator unit 18a and the adjacent first pole shoe 22a of the second generator unit 18b have the same magnetic polarity. Consequently, the creation of a magnetic circuit between adjacent units is avoided. Some magnetic flux is still generated between the North and South poles of each permanent magnet, which represents a flux leakage within each generator unit 18a, 18b.

Figure 3C:
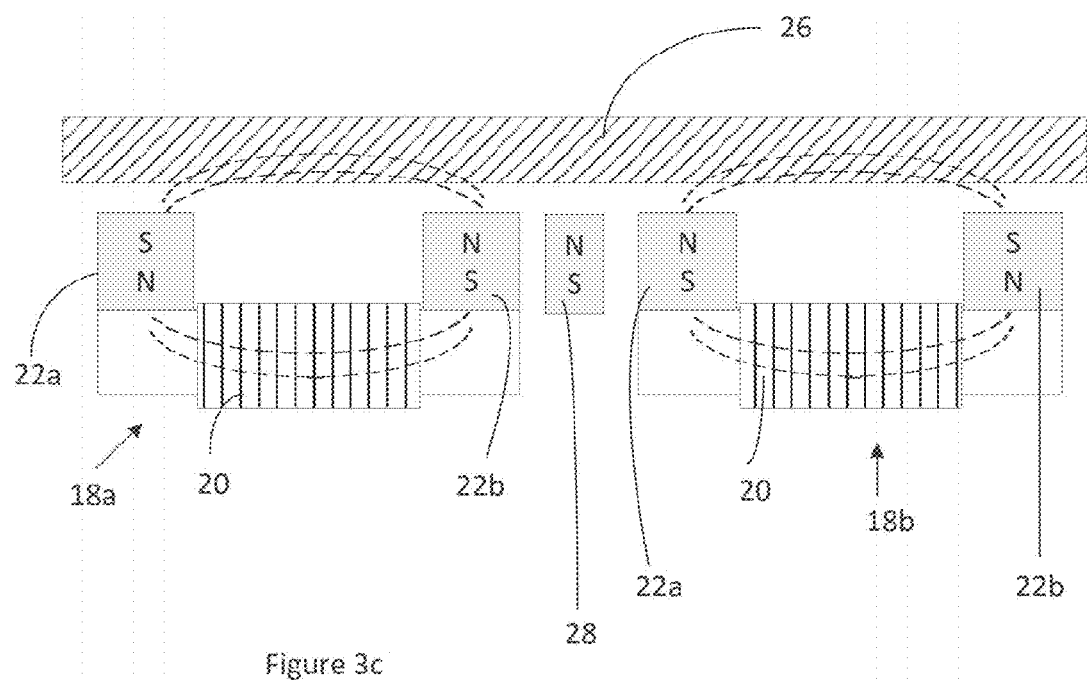
FIG. 3c is a schematic illustration of a further embodiment of an assembly according to the invention.

In a preferred embodiment of the invention, the power generating assembly comprises a guide magnet arranged between adjacent pole shoes 22b, 22a of at least one set of adjacent generating units 18a, 18b. The effect of the guide magnet 28 is shown in FIG. 3c, where the first and second units 18a, 18b are shown in a situation where both are underneath the saddle adapter 26. The guide magnet 28 is magnetized in the same direction as the adjacent pole shoes of the first and second generator units. As a result, "stray" magnetic flux is guided through the saddle adaptor and through the coil 20 of each unit, to enhance the desired magnetic circuit and generator field of each generator. Preferably, a guide magnet 28 is arranged between each set of adjacent generator units, as shown in FIG. 1.

In a still further development of the invention, at least one generator unit comprises a shunt magnet, which has the effect of enhancing the power efficiency of the unit. This will be explained with reference to FIGS. 2a, 2b, 4a and 4b.

The power output of the generator unit 18a is dependent of the magnitude of the change in magnetic flux when the unit rotates between the first and second rotational positions. In the first rotational position, as depicted in FIG. 2a, a weak flux $\phi 1$ passes between the pole shoes 22a, 22b and through the coil 20. A much stronger flux $\phi 2$ passes between the pole shoes 22a, 22b and through the coil 20 in the second rotational position, as depicted in FIG. 2b. This gives rise to a first change in flux $\Delta\phi 1$, whereby $\Delta\phi 1 = \phi 2 - \phi 1$.

Figure 4B:
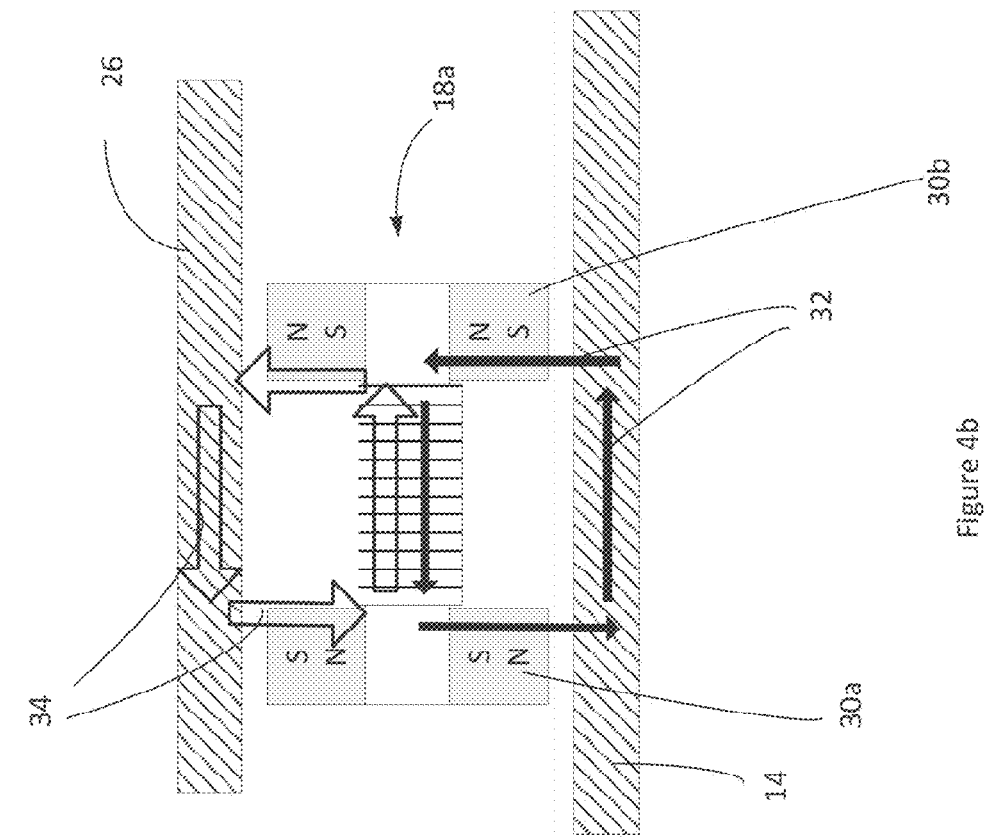
FIGS. 4a and 4b are schematic illustrations of a generator unit of a still further embodiment of the invention, shown in first and second rotational positions respectively.
Figure 4A:
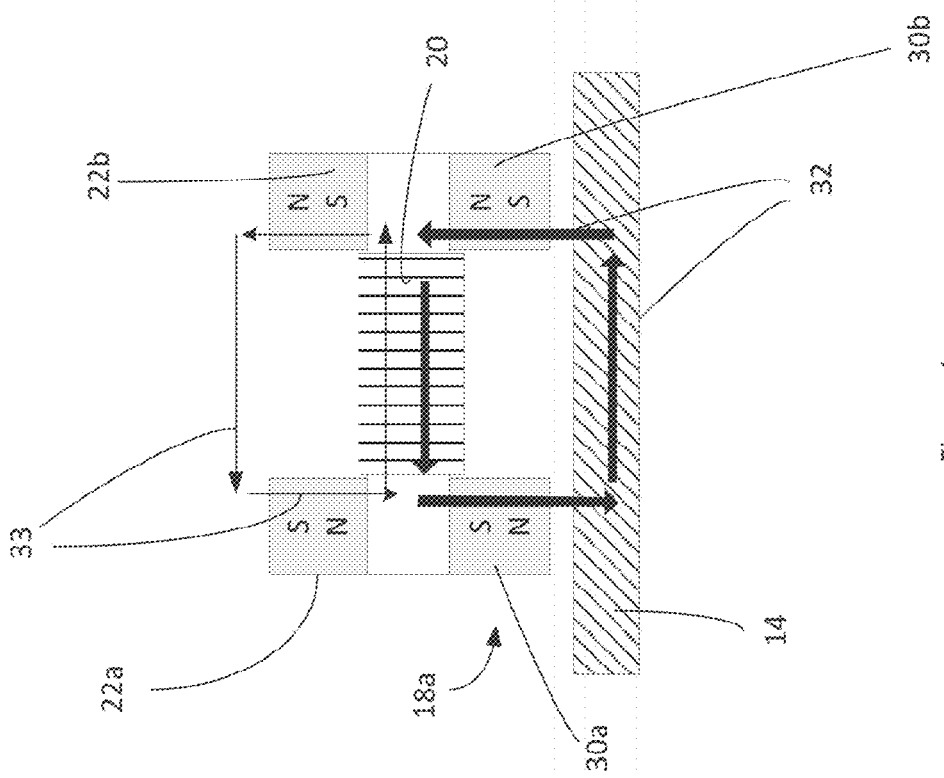

In the embodiment depicted in FIGS. 4a and 4b, the generator unit comprises first and second shunt magnets 30a, 30b arranged radially inward of the first and second pole shoes 22a, 22b respectively and radially outward of the end cap 14. Apart from the shunt magnets, the unit of FIGS. 4a and 4b is identical to that of FIGS. 2a and 2b. The shunt magnets 30a, 30b and the end cap 14, which is made of a ferromagnetic material, produce a magnetic circuit, whereby the associated flux passing though the coil will be referred to as the shunt flux, and is represented by arrows 32 in FIG. 4a. The flux passing between the pole shoes 22a, 22b and through the coil 20, illustrated by the arrows 33, will be referred to as the generator flux. The shunt flux is oppositely oriented from the generator flux and, in the open first position, shown in FIG. 4a, is stronger than the generator flux. The net flux $\phi 3$ is therefore relatively weaker and may even be negative compared to the flux $\phi 1$ of the configuration shown in FIG. 2a.

In the closed position shown in FIG. 4b, the generator flux indicated by arrows 34 is significantly stronger than in the open position. The oppositely oriented shunt flux interacts with the generator flux such that a net flux $\phi 4$ passes through the coil 20. The net flux $\phi 4$ is smaller than the initial flux $\phi 2$ generated in the FIG. 2b configuration; however, the reduction is relatively less compared with the reduction in the open position. This is particularly the case when the initial flux $\phi 2$ would result in saturation. Consequently, the resulting change in flux $\Delta\phi 2$, given by $\phi 4 - \phi 3$, is larger than the change in flux $\Delta\phi 1$ for the configuration without shunt magnets, leading to improved power output.

Further embodiments of the invention include cases where the rotating part comprises at least one counterweight unit configured to compensate for imbalances created by the arrangement of generator units 18a-18d. In addition, the saddle adaptor 26 may include a main body part and at least one additional piece configured to increase the surface area of the saddle adaptor 26 and/or decrease the air gap provided between the saddle adaptor 26 and the pole shoes 22a, 22b.

The electronics section 16c of the rotating part 16a includes power harvesting electronics configured to accumulate AC power generated by the oscillating magnetic field passing through the coils and at least one condition monitoring sensor such as a temperature sensor, an acoustic emission sensor or a vibration sensor for measuring operating parameters of the bearing and/or of the axle. Further, the electronics section includes a wireless transmitter configured to be driven by power generated by the generator units 18a-18d.

The invention claimed is:

1. A power generator assembly including a rotating part and a non-rotating part, wherein
the rotating part includes first and second, circumferentially adjacent generator units, wherein
each generator unit includes at least one coil, at least one permanent magnet and two pole shoes having pole surfaces facing radially outward, wherein
the non-rotating part includes an arc-shaped saddle adaptor of ferromagnetic material arranged with a radial distance to the pole surfaces, wherein
the saddle adaptor is configured to close a magnetic circuit passing via the pole shoes through the coil in a rotational position where the saddle adaptor overlaps with the pole shoes of a generator unit, wherein
a pole shoe of the first generator unit and an adjacent pole shoe of the second generator unit have the same magnetic polarity, and wherein
the rotating part includes an additional permanent magnet arranged between the adjacent pole shoes of the first and second generator units, wherein the additional permanent magnet is configured to substantially prevent magnetic flux leakage between magnetic flux circuits of the first and second generator units.

2. The power generator assembly according to claim 1, wherein
the circumferential lengths of the generator units and of the saddle adaptor are such that at least one rotational position exists where the saddle adaptor does not overlap with the pole shoes of a generator unit.

3. The power generator assembly according to claim 1, wherein
the rotating part is configured to be mounted on an end cap configured to hold a bearing of a train axle and the saddle adaptor is configured to be mounted on a railway bogie side frame.

4. The power generator assembly according to claim 1, wherein
the rotating part comprises at least one counterweight unit configured to compensate for imbalances created by the generator units.

5. The power generator assembly according to claim 4, wherein
the counterweight unit comprises a further generator unit having at least one permanent magnet, at least one coil and two pole shoes, the further generator unit being arranged at an angular interval to the first and second generator units.

6. The power generator assembly according to claim 1, wherein
a radially inner surface of the saddle adaptor, which faces the pole surfaces, has a toothed profile such that varying radial gap exists between the pole surfaces and saddle adapter.

7. A railway bogie side frame including the power generator assembly according to claim 1.

8. The power generator assembly according to claim 1, wherein at least one of the generator units includes a shunt magnet arranged in proximity to the magnetic field of the at least one generator unit, wherein the shunt magnet generates an oppositely oriented magnetic field.

9. A power generator assembly including a rotating part and a non-rotating part, wherein
the rotating part includes first and second, circumferentially adjacent generator units, wherein
each generator unit includes at least one coil, at least one permanent magnet and two pole shoes having pole surfaces facing radially outward, wherein
the non-rotating part includes an arc-shaped saddle adaptor of ferromagnetic material arranged with a radial distance to the pole surfaces, wherein
the saddle adaptor is configured to close a magnetic circuit passing via the pole shoes through the coil in a rotational position where the saddle adaptor overlaps with the pole shoes of a generator unit, wherein
a pole shoe of the first generator unit and an adjacent pole shoe of the second generator unit have the same magnetic polarity, and wherein
at least one of the generator units includes a shunt magnet arranged in proximity to the magnetic field of the at least one generator unit, wherein the shunt magnet generates an oppositely oriented magnetic field.

10. The power generator assembly according to claim 9, wherein the shunt magnet is arranged radially inward of the at least one generator unit.

11. The power generator assembly according to claim 9, wherein
the circumferential lengths of the generator units and of the saddle adaptor are such that at least one rotational position exists where the saddle adaptor does not overlap with the pole shoes of a generator unit.

12. The power generator assembly according claim 9, wherein
the rotating part is configured to be mounted on an end cap configured to hold a bearing of a train axle and the saddle adaptor is configured to be mounted on a railway bogie side frame.

13. The power generator assembly according claim 9, wherein
the rotating part comprises at least one counterweight unit configured to compensate for imbalances created by the generator units.

14. The power generator assembly according to claim 13, wherein
the counterweight unit comprises a further generator unit having at least one permanent magnet, at least one coil and two pole shoes, the further generator unit being arranged at an angular interval to the first and second generator units.

15. The power generator assembly according claim 9, wherein
a radially inner surface of the saddle adaptor, which faces the pole surfaces, has a toothed profile such that varying radial gap exists between the pole surfaces and saddle adapter.

16. A railway bogie side frame including the power generator assembly according to claim 9.

* * * * *